United States Patent [19]
Meredith et al.

[11] Patent Number: 5,141,353
[45] Date of Patent: Aug. 25, 1992

[54] IMPLEMENT HAVING A THERMOPLASTIC HANDLE MOLDED OVER AN INTERMEDIATE PORTION OF A WORKING HEAD

[75] Inventors: William C. Meredith; Jerry R. Meredith, Jr., both of Powder Springs, Ga.

[73] Assignee: Lifetime Tool Company, Incorporated, Madison Heights, Mich.

[21] Appl. No.: 325,103

[22] Filed: Mar. 15, 1989

Related U.S. Application Data

[63] Continuation of Ser. No. 895,515, Aug. 11, 1986, abandoned, which is a continuation-in-part of Ser. No. 587,381, Mar. 8, 1984, abandoned, which is a continuation-in-part of Ser. No. 491,245, May 3, 1983, abandoned.

[51] Int. Cl.$^5$ .............................. A01B 1/22; B25G 3/34
[52] U.S. Cl. ..................... 403/267; 403/265; 30/308.1; 30/343; 81/26; 294/57
[58] Field of Search ............... 294/49, 51, 54.5, 55, 294/55.5, 57, 59, 60; 7/143–147, 167; 16/110 R, 116 R, DIG. 18, DIG. 19, DIG. 24; 30/308.1, 340, 342–344; 76/109, 111, 113; 81/20, 22, 26, 489, 492; 172/371, 378, 380, 381; 403/265–269

[56] References Cited

U.S. PATENT DOCUMENTS

| | | | |
|---|---|---|---|
| 2,290,249 | 7/1942 | Piperoux . | |
| 2,382,304 | 8/1945 | Foltz et al. | 30/343 |
| 2,436,476 | 2/1948 | Kulesh | 76/111 |
| 2,458,815 | 1/1949 | Winkler | 403/269 |
| 3,090,653 | 5/1963 | Stump . | |
| 3,232,355 | 2/1966 | Woolworth | 172/378 |
| 3,355,226 | 11/1967 | Portz . | |
| 3,770,033 | 11/1973 | Gavillet et al. . | |
| 4,023,606 | 5/1977 | Kneissl | 30/308.1 |
| 4,039,012 | 8/1977 | Cook . | |
| 4,089,356 | 5/1978 | O'Connor . | |
| 4,280,727 | 7/1981 | Germain | 294/54.5 |
| 4,334,563 | 6/1982 | Epel et al. . | |
| 4,516,615 | 5/1985 | Finn | 81/20 |

FOREIGN PATENT DOCUMENTS

| | | | |
|---|---|---|---|
| 2112539 | 3/1972 | Fed. Rep. of Germany . | |
| 1050154 | 1/1954 | France | 403/269 |
| 1102285 | 10/1955 | France . | |
| 1227264 | 8/1960 | France | 81/20 |
| 1573992 | 7/1969 | France . | |
| 2057106 | 5/1971 | France . | |
| 2220354 | 10/1974 | France . | |
| 2274407 | 1/1976 | France . | |
| 2337612 | 8/1977 | France . | |
| 2452232 | 11/1980 | France | 294/57 |
| 2489209 | 3/1982 | France . | |
| 2084067 | 4/1982 | France . | |
| 865287 | 4/1961 | United Kingdom | 81/22 |
| 1270921 | 4/1972 | United Kingdom | 294/57 |
| 1553003 | 9/1979 | United Kingdom . | |

*Primary Examiner*—Johnny D. Cherry
*Attorney, Agent, or Firm*—Banner, Birch, McKie & Beckett

[57] ABSTRACT

An improved implement including an injection molded thermoplastic handle and an implement head adapted to be placed in the mold in which the handle is to be manufactured in the injection molding process, and in which the implement head is adapted to receive and retain heated thermoplastic material injected under pressure and which the portion for retaining heated thermoplastic material is in communication with the handle, and in which the interface formed between the portion for retaining heated thermoplastic material in the adapted implement head and the thermoplastic material retained thereby forms a bond joining the adapted implement head and the injection molded handle.

16 Claims, 8 Drawing Sheets

IMPLEMENT HAVING A THERMOPLASTIC HANDLE MOLDED OVER AN INTERMEDIATE PORTION OF A WORKING HEAD

"CROSS-REFERENCE TO RELATED APPLICATION"

This application is a continuation of application Ser. No. 06/895,515, filed Aug. 11, 1986, abandoned, which is a continuation-in-part of application Ser. No. 06/587,381, filed Mar. 8, 1984, abandoned, which is a continuation-in-part of application Ser. No. 06/491,245, filed May 3, 1983, abandoned.

TECHNICAL FIELD

This invention relates generally to hand implements or tools and methods of manufacture thereof. More particularly, this invention relates to an improved implement including an injection molded thermoplastic handle and an implement head adapted to receive heated thermoplastic material injected under pressure. The interface between the adapted implement head and the thermoplastic handle material forms a bond joining the implement head and the thermoplastic handle.

BACKGROUND OF THE INVENTION

In the past, most implement handles have been manufactured from wood. The disadvantages of implements having wood handles are that such handles are prone to splinter, deteriorate or break. Additionally, the implement head may either come loose or come off the wooden handle.

Additionally, attempts have been made to fabricate plastic implement handles. The difficulty with such plastic implement handles, however, is that the methods of attaching the implement head to the implement handle have either involved adhesives or some form of mechanical fastener, such as a bolt, a pin or screw. Such adhesive or mechanical methods of attachment are also subject to the same difficulties encountered in implements having wood handles in that the implement head is likely either to come loose or to come off the implement handle.

SUMMARY OF THE INVENTION

The invention disclosed herein is an improved implement which includes an injection molded thermoplastic handle and an implement head specially adapted to receive heated thermoplastic material injected under pressure and in which the interface between the adapted implement head and the thermoplastic material forms a bond joining the adapted implement head and the injection molded thermoplastic handle.

More particularly described, the improved implement of the present invention is manufactured by a process of injection-molding thermoplastic nylon material into a mold which has a first cavity portion sized to fit tightly about the working surfaces of the tool head so as to exclude molded thermoplastic material from the working surfaces, and a second cavity portion which receives a web portion of the tool he ad and allow s the thermoplastic material to flow completely around the web portion of the tool head. Preferably, a hole is provided in the web portion of the tool head which allows the thermoplastic material on one side of the web portion of the tool head to intimately join with the thermoplastic material on the opposite side of the web portion of the tool head, to lock the tool head to the handle. Advantageously, therefore, there is provided a strengthened permanent unitary junction between the implement working head and the handle.

Generally, in the tools made in accordance with the present invention, the tool handle is attached to the head by molded portions integral with the handle and which extend completely about a web portion. The tools are molded by a process whereby a metal tool head is disposed in a mold cavity, where the mold cavity includes a mold cavity portion which fits closely about the working surface or ends of the tool head such as to exclude mold material from the working surfaces. A second mold cavity portion is also provided for receiving the web portion of the tool head, such that mold material can flow about and enclose or encapsulate the web portion. The second mold cavity portion is integral and communicates with a handle cavity portion such that the molded material, after injection and hardening, forms a handle integral with the portions molded about the web portion of the tool head, to attach the handle to the head.

Additionally, for some types of tools, there is provided a tool head having a web portion connected to a pair of adjacent opposed working end portions. The web portion is of less thickness and width than the adjacent opposed end portions, to define together with the end portions a peripheral groove extending completely about the tool head. This groove is filled with mold material when the handle is formed.

For other types of tools, there is provided a tool head having a web portion connected to an adjacent working end portion. The web portion may include holes extending through the thickness of the web, and may include flanges extending outwardly away from the surface of the web portion.

Moreover, for tools such as hoes, rakes, shovels, and the like, the molded portions extending about the tool head web portion may be made larger than the corresponding dimensions of the web portion to define an integrally formed step or foot surface, such that a tool user can apply pressure to the tool during use by stepping on the step with his or her foot.

While the following specification and preferred embodiments are particularly directed toward hand held implements, it will be understood that the present invention relates to implements which may be attached to machinery and to other types of implements as well.

It is an object of this invention to provide a strong, durable injection molded implement handle.

Another object of this invention is to provide an adapted implement head structure and method of bonding an injection molded thermoplastic implement handle to an implement head such that the head will not come loose or come off the handle.

It is another object of the present invention to provide an implement handle which is lightweight in comparison to its strength and durability.

It is another object of this invention to provide an implement handle which will resist bending and twisting, but which can be made to have a broad range of flexibilities in keeping with the purpose for which the implement is to be used.

It is another object of the present invention to provide an implement handle which will not splinter and which will have the desired hardness and smoothness.

The foregoing objectives and advantages of the present invention, as well as additional objectives and advantages of the present invention, will be understood more fully by reading the following description of preferred embodiments of the present invention and by reviewing the attached drawings of preferred embodiments of the present invention, in which specification and drawings the parts shown in the drawing and the parts described in the specification are identified by like numbers.

DETAILED DESCRIPTION OF ALTERNATIVE EMBODIMENTS AND METHODS OF MANUFACTURE

It will be understood that the following description of alternative preferred embodiments is set forth solely for the purpose of enabling persons skilled in the art to make and use the present invention according to the inventors' preferred embodiments, and such description is not intended to limit or restrict the scope of the present invention in any way. The scope of the present invention is limited solely by reference to the appended claims.

As set forth in the foregoing objectives of the invention, it will be appreciated by those skilled in the art that one of the difficulties in construction of various implements has traditionally been the attachment of the implement head to a strong and durable implement handle. As shown in FIGS. 1 through 25, the various embodiments of the present invention all embody an injection molded thermoplastic handle. The material chosen for the injection molded thermoplastic handle may be one of a variety of thermoplastic materials currently available on the market. The choice of the thermoplastic to be used as the material for the implement handle for any particular implement should be selected with a view toward the flexibility, rigidity, strength, hardness and other qualities which are required in the particular application for which the thermoplastic material is to be used.

As used in the preferred embodiments disclosed herein, it has been found that an injection molded grade of nylon thermoplastic material, such as DuPont FE 8018-14 glass, DuPont Zytel brand, or another comparable brand produces desirable results in the hand held implements disclosed herein. Additionally, rubber and other additives may be added to the foregoing compound if the copolymers do not provide adequate flexibility. Further, in order to add mass and reduce shrinkage, glass, foam, talc or carbon fillers may be added, if desired. Also, a polyethylene shield may also be injection molded over all or part of the handle to further reduce the likelihood of breakage or damage to the product.

Figure 6:
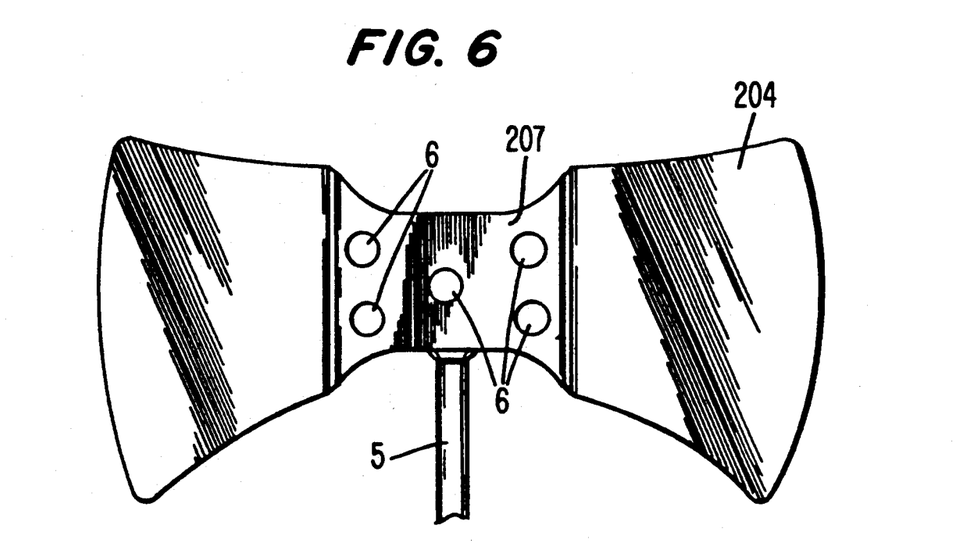
FIG. 6 is a side view of the adapted axe head and also an alternative metal stem as used in the preferred embodiment as shown in FIG. 4.

In addition to the selection of a strong and durable thermoplastic for use in the implement handle, the implement also may be reinforced as shown in FIG. 6. As shown in FIG. 6, the double-edged axe head 204 (or other implement head) may be reinforced by a metal rod 5 which is welded to the axe head and which extends longitudinally in the direction of the length of the axe handle 10b to provide further reinforcement for the thermoplastic material.

Figure 1:
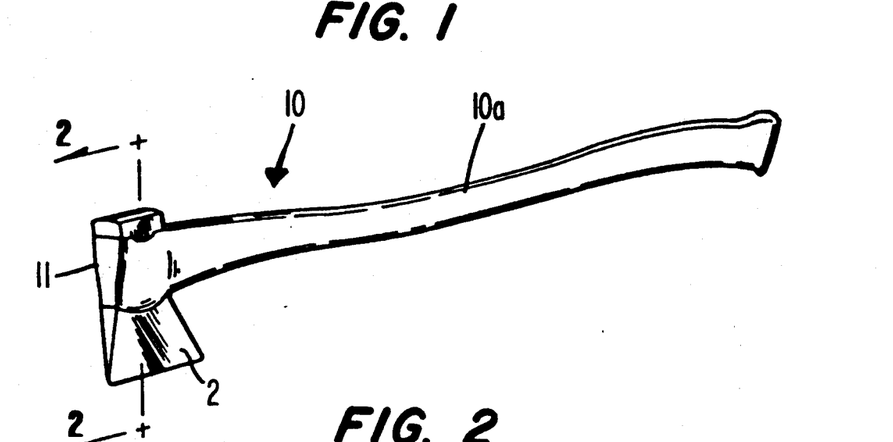
FIG. 1 is a perspective view of a preferred embodiment of the present invention as applied to a single bladed axe.
Figure 2:
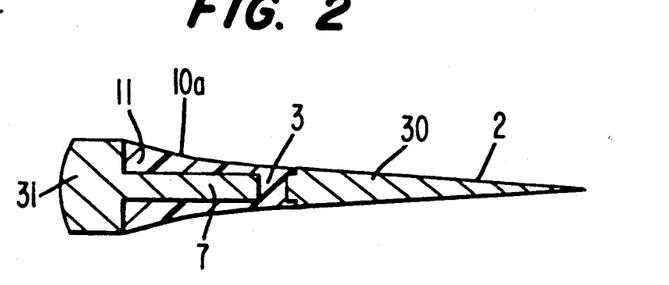
FIG. 2 is a cross-sectional view of the single bladed axe head and handle taken along section 2—2 of FIG. 1 and showing the adapted structure of the axe head by which the axe head is bonded to the axe handle.
Figure 3:
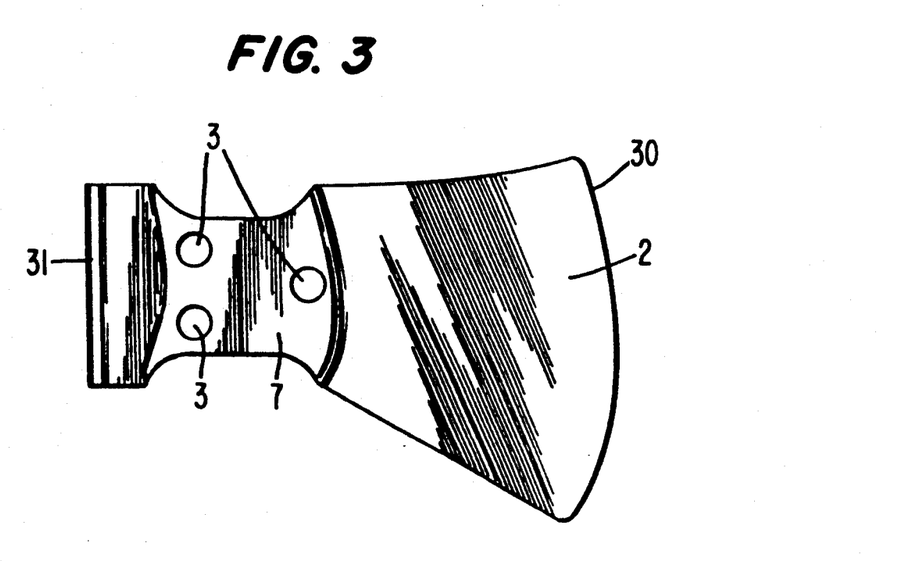
FIG. 3 is a side view of an adapted axe head for use in the preferred embodiment of the invention shown in FIG. 1.

Various views of a preferred embodiment of the present invention as applied to a single-edged axe are shown in FIGS. 1 through 3. As shown in FIG. 3, the single-bladed axe head 2 is adapted by drilling holes 3 through the web portion of the axe head around and through which the injection molded thermoplastic material will be introduced in the injection molding process as shown in FIG. 2. As shown in FIG. 1, the single-bladed axe is manufactured by placing the axe head 2 in the mold in which the axe handle 10a is to be formed and allowing the heated thermoplastic material to be injected into the mold under pressure in order to cause the thermoplastic material to surround the web portion 7 of the axe head 2 and to pass through the holes 3 in the adapted axe head 2 in order to form a unitary integral mass or bond joining the adapted axe head 2 to the injection molded handle 10. The mass of thermoplastic material molded around the web portion 7 of the head forms a unitary head locking handle portion 11 of the handle 10.

Figure 4:
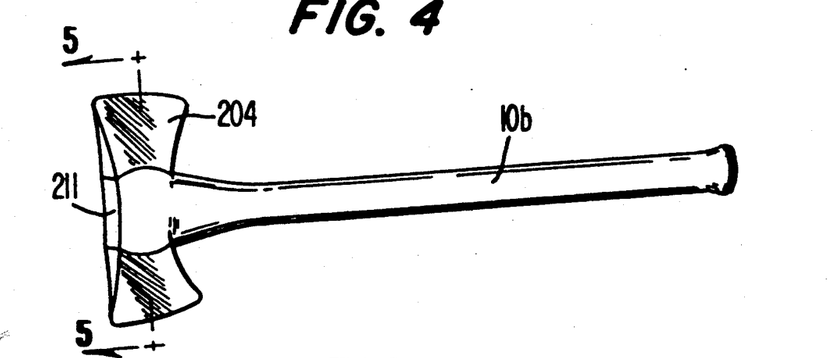
FIG. 4 is a perspective view of a preferred embodiment of the present invention as used in a double-edged axe and axe handle.
Figure 5:
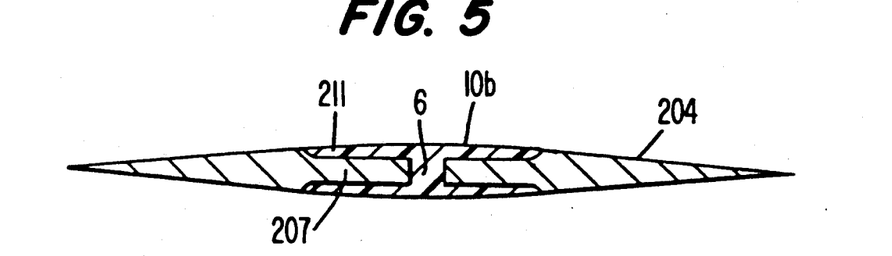
FIG. 5 is a cross-sectional view taken along lines 5—5 of FIG. 4 and showing the adapted structure whereby the adapted double-edged axe head is bonded to the axe handle.

As shown in FIGS. 4 through 6, a preferred embodiment of a double-edged axe also may be manufactured according to the present invention. In the same manner in which the single-edged axe was manufactured, the double-edge axe head 204 is placed in the mold in which the axe handle 10b is to be formed in a cavity which is shaped to receive the entire implement working head. A mold 15 particularly constructed for the double-edge axe is more particularly shown in FIGS. 21, 22, and 23. The cavity 19 includes a first portion 20 sized and shaped to fit tightly about the working surfaces of the tool head so as to exclude mold material and prevent coverage of the working surfaces of the tool by the thermoplastic in the injection molding process. The cavity 19 further includes a second portion 21 which receives the web portion 207 of the working head 204 and which is sized larger than the web portion 207 so that the thermoplastic handle material flows completely around the web portion of the head and through the holes 6, to enclose and encapsulate the web portion to form a unitary implement head locking handle portion 211 together with the handle 10.

Heated thermoplastic material then is introduced into the mold 15 (shown as two pieces 15b and 15u in FIGS. 21-23) under pressure and allowed to pass through the holes 6 in that portion of the axe head 204 which is surrounded by the axe handle 10. In this manner the interface between the adapted double-edged axe head 204 and the thermoplastic material forms a bond joining the adapted double-edged axe head 204 to the axe handle 10.

Additionally, as shown in FIG. 6 and as discussed more fully above, a metallic rod 5 may be welded to the double-edged axe head 204 (or other implement head) in order to provide additional strength to the handle 10.

Generally speaking, the improved implements of the present invention include unitary implement working heads having a working surface portion and a handle attaching or web portion. For implements such as double headed axes, mauls, and sledges (FIGS. 1-10) there is preferably provided an intermediate handle attaching web portion 7, 207, 307 or 407 positioned between a pair of opposed working end portions or surfaces of the tool or implement head. The completed injection molded thermoplastic handle generally comprises a working head attaching portion 11, 211, 311 or 411 and an elongate handle portion 10 for grasping. The working head attaching portion 11, 271, 311 or 411 and handle portion 10 are integrally formed in the mold. The working head attaching portion 11, 211, 311 or 411 of the handle is molded around substantially all of the web portion 7, 207, 307 or 407 of the implement head so as to lock the head to the handle.

The single edge axe of FIGS. 1, 2, and 3 is considered a double headed tool because it consists of the blade 30, hammer portion 31 and intermediate web portion 7. In general, for two-ended tools the width and thickness of the web portion 7 is less than the width and thickness of the adjacent opposed end portions such as the hammer 31 and blade 30, to define together with the end portions a peripheral groove extending completely about the tool head. As best seen in FIG. 3, the width of the web portion 7 is less than the width of the blade 30 or of the hammer 31, so as to allow the thermoplastic material to flow around the web portion 7. As best seen in FIG. 2, the thickness of the web portion 7 is less than the thickness of the blade 30 or of the hammer 31, again to allow the thermoplastic material to flow around the web portion 7, through the holes 3, to provide a smooth coextensive surface of the unitary head locking portion 11 which extends between the blade 30 and the hammer 31 across both the width and the thickness of the head locking portion 11.

Advantageously, the coextensive surface of the head locking portion 11 with the outer surface of the blade 30 and the hammer 31 provides an esthetically pleasing appearance, and presents a smooth outer surface between the handle and the working head to minimize the likelihood of damage to the junction between the handle and the working head by virtue of water seepage, snagging during use, or protruding surfaces which might be stricken during use.

Figure 7:
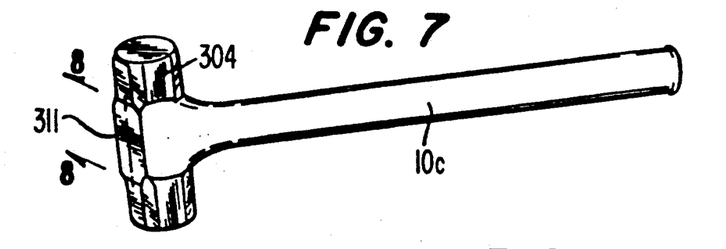
FIG. 7 is a perspective view of a preferred embodiment of the present invention as used in a sledge hammer.
Figure 8:
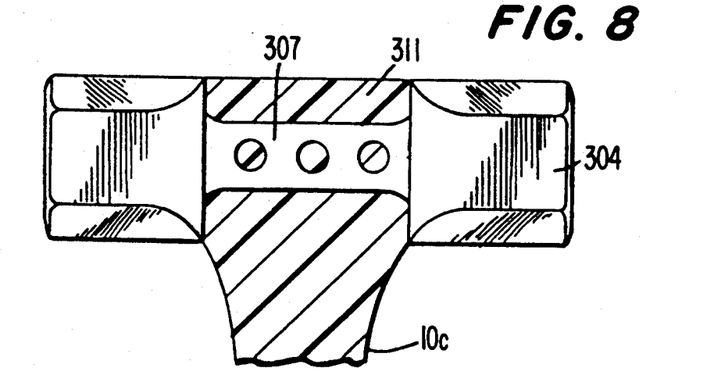
FIG. 8 is a cross-section view taken along lines 8—8 of FIG. 7 showing the structure whereby the adapted sledge hammer head is bonded to the handle of the sledge hammer.
Figure 9:
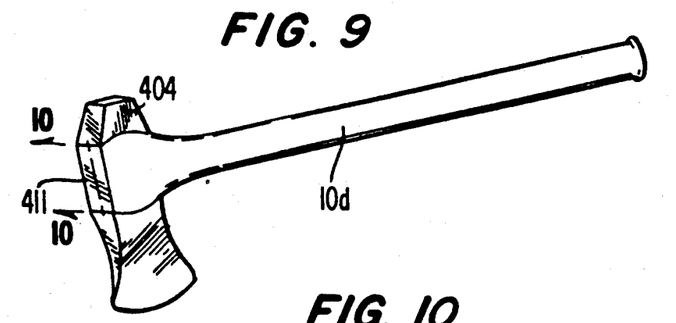
FIG. 9 is a perspective view of a preferred embodiment of the present invention as applied to a single head maul.
Figure 10:
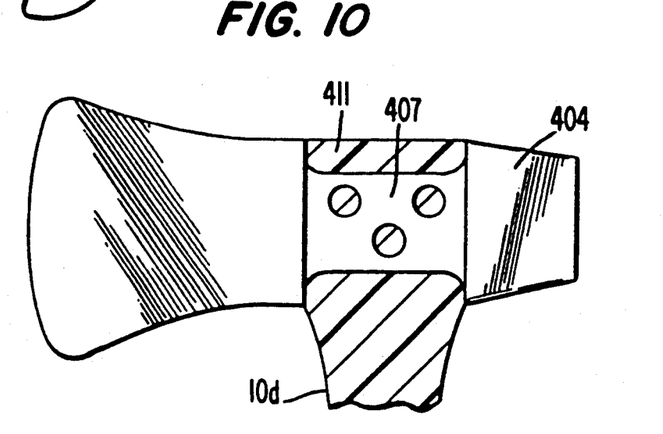
FIG. 10 is a cross-sectional view of the single head maul and handle taken along the line 10—10 of FIG. 9.

The double-edged axe of FIG. 4, 5, and 6, the sledge hammer of FIGS. 7 and 8, and the maul of FIGS. 9 and 10 are other examples of improved implements comprising a unitary implement working head having a pair of opposed working surface portions joined by an intermediate web portion, 207, 307 or 407 positioned between the opposed end portions, and wherein the thickness and width of the web is less than the respective thickness and width of the adjacent end portions defining a peripheral groove extending completely about the head. When completed, these implements as well have coextensive surfaces between the working head attaching portion 11 of the handle with the working surfaces of the implement head.

Figure 17:
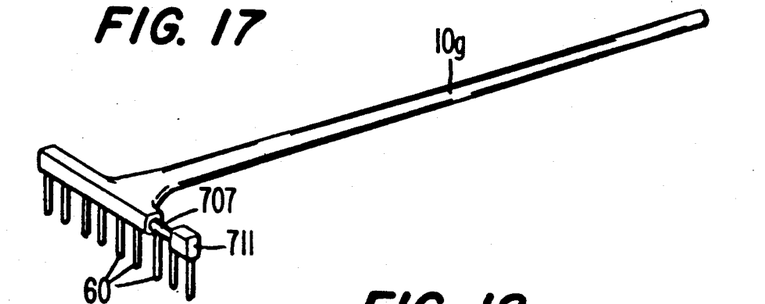
FIG. 17 is a perspective view of a preferred embodiment of the present invention as applied to a rake, with a portion of the rake cut away to show the attachment of the tine web.
Figure 18:
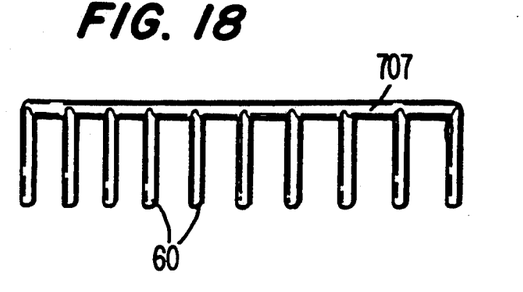
FIG. 18 shows the tine web of the rake of FIG. 17.

It is also considered within the scope of the present invention to provide a unitary implement working head having a length, a width, and a thickness with a first working surface portion and a web portion extending in the direction of the length of the implement head. For example, the shovel of FIGS. 11, 12, and 13, and the hoe of FIGS. 14, 15, and 16, and the rake of FIGS. 17 and 18 are examples of this type of implement.

Figure 11:
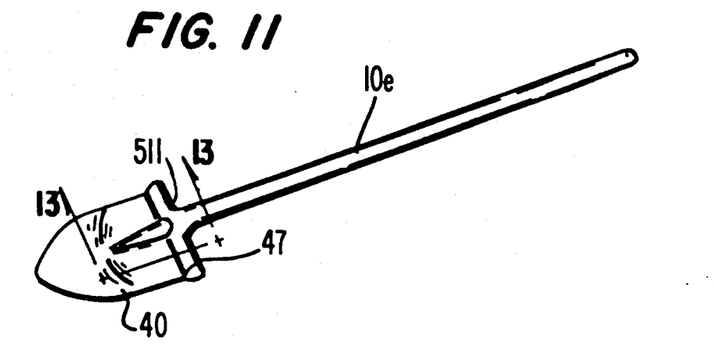
FIG. 11 is a perspective view of a preferred embodiment of the present invention as applied to a shovel.
Figure 12:
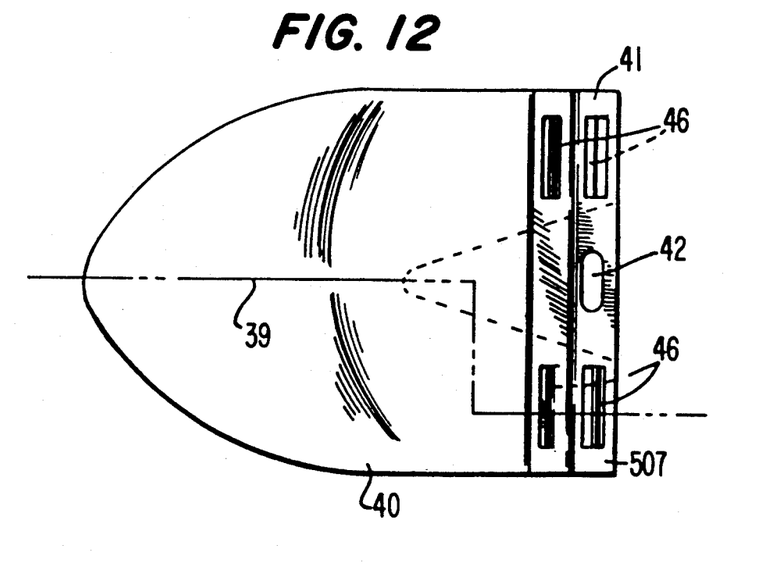
FIG. 12 is a top view of the shovel head employed in the embodiment of FIG. 11.
Figure 13:
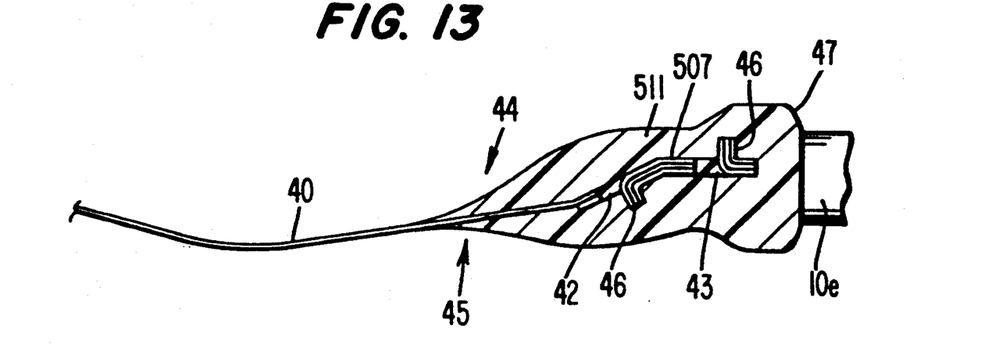
FIG. 13 is a cross-sectional view of the shovel of FIG. 11 taken along the line 13—13.

With particular reference now to FIGS. 11 and 12, the shovel includes a working surface portion or blade 40, and a web portion 507 extending in the direction of the length (as defined by the line or axis 39) of the head or blade 40. Preferably, the web portion 507 of the shovel includes at least one hole 42 extending through the thickness of the shovel for allowing thermoplastic material on the top 44 of the shovel to flow through and intimately join with the thermoplastic material on the bottom 45 of the shovel. Additional holes 43 can also be provided across the width of the web portion 507. As seen in FIG. 13, the thermoplastic of the handle 10e is molded around the web portion 507 and through the holes 42, 43 to lock the handle to the shovel blade 40.

As also illustrated in FIGS. 11, 12, and 13, there may also be provided flange members 46 formed on the web portion 507 extending generally in the direction of the thickness of the web and extending into the thermoplastic material of the handle 10e to further lock the handle to the working head.

In the preferred embodiment of the shovel, the head locking handle portion 511 which is mold about the web 7 has a greater thickness than the corresponding thickness of the web 507 to define an integrally formed step portion 47 extending about the web. Advantageously, a user of the tool can step on the step portion 47 to apply pressure to the shovel without having a thin, sharp blade cut into the bottom of the user's shoe or foot. Such a step portion can be formed for my tool requiring same, such as the rake or hoe, by increasing the size of the mold cavity which receives the web portion of the tool head.

Figures 14, 15, 16:
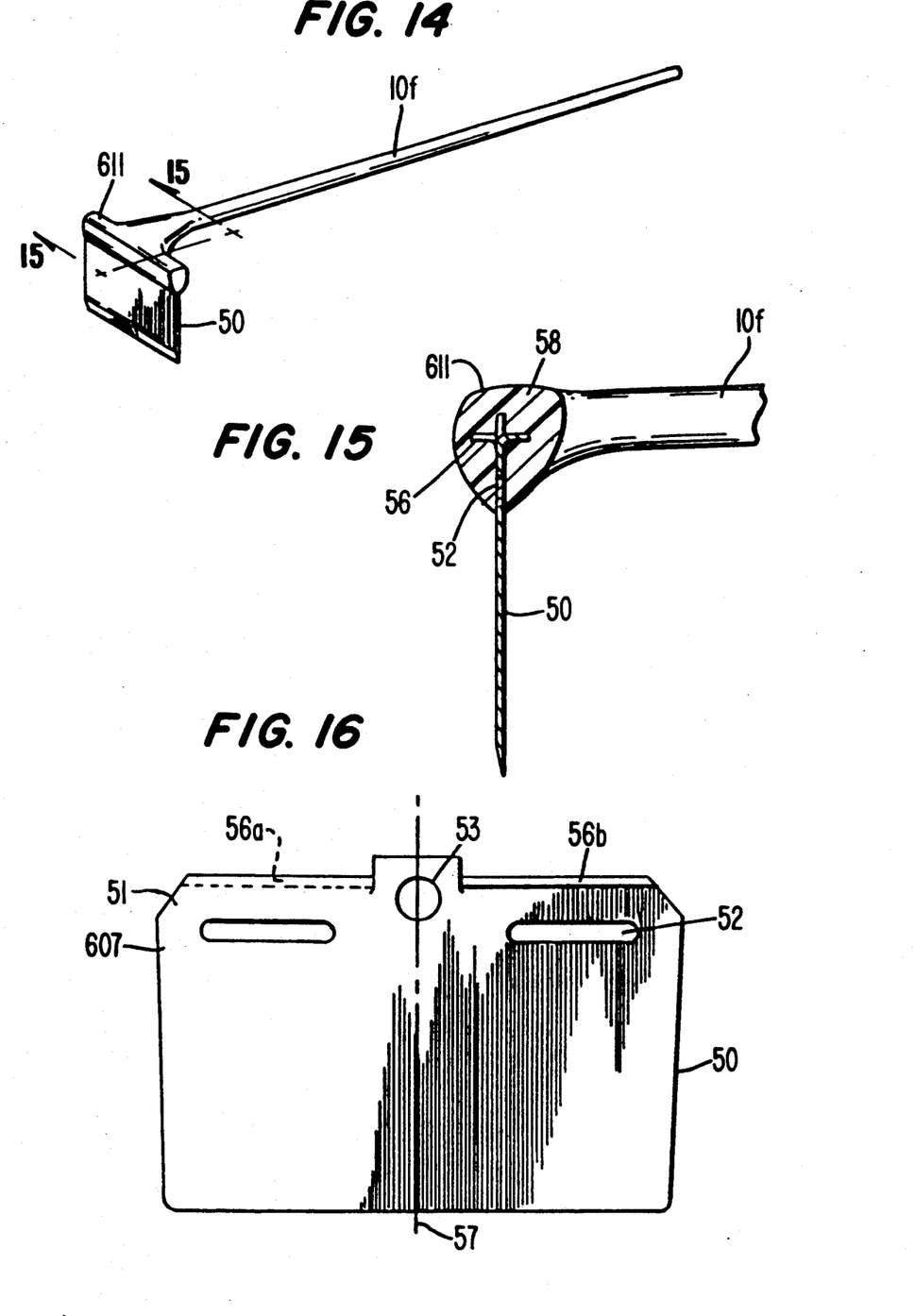
FIG. 14 is a perspective view of a preferred embodiment of the present invention as applied to a hoe.
FIG. 15 is a cross-sectional view of the hoe of FIG. 14 taken along the line 15—15.
FIG. 16 is a front view of the hoe head employed in the embodiment shown in FIG. 14.

FIGS. 14, 15, and 16, illustrate a hoe which includes a handle 10f, a working head attaching portion 611, a blade 50, a web portion 607 extending in the direction of the length of the blade (as defined by line 57), holes 52, 53, and flange members 56, similar to that of the shovel. There may also be provided a step portion 58 for the hoe.

FIGS. 17 and 18 illustrate an improved rake. The rake comprises a handle portion 10g, a head locking handle portion 711 integral with the handle, and a unitary elongate rake web 707 including a plurality of integral teeth or tines 60. Each of the teeth has a length, a width, and a thickness. The teeth extend along their length outwardly from the web portion in a row, thereby forming a structure resembling a comb. As shown in FIG. 17, the head locking handle portion 711 is molded around the web 707 to lock the handle to the web and form an integral structure.

Figure 19:
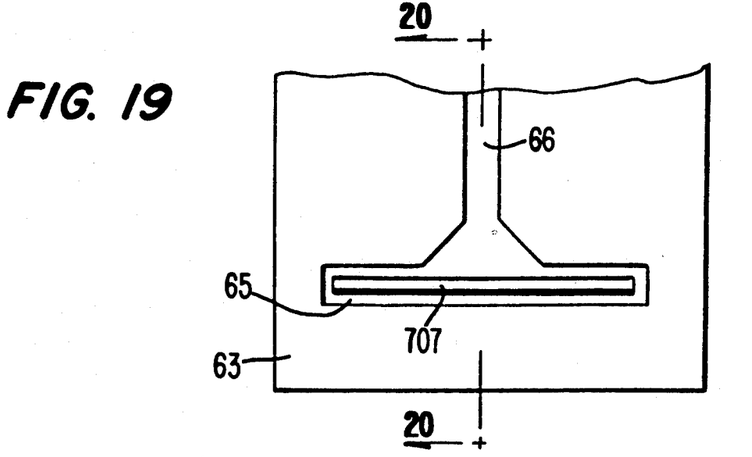
FIG. 19 is a top view of an injection mold bottom tray used to form the rake of FIG. 17.
Figure 20:
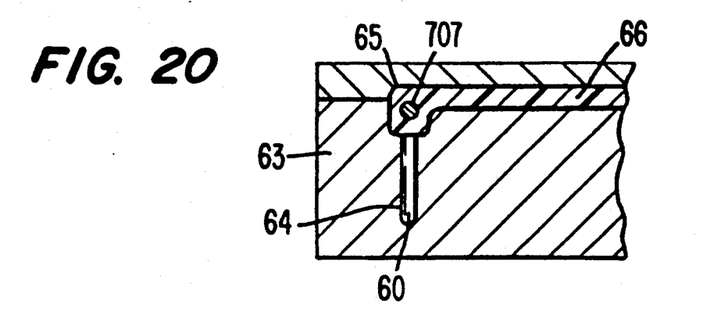
FIG. 20 is a cross-sectional view taken along the line 20—20 of FIG. 19, with the mold top half in place.

As shown in FIGS. 19 and 20, the rake handle is molded by placing the rake web 707 into a mold bottom half 63 in a cavity 64 which is sized to receive and fit tightly about the teeth 60 so as to exclude molded material from the surface thereof. A handle attaching cavity 65 is provided for receiving mold material and for allowing injected mold material to flow completely around the web 707 to form the head locking handle portion 711. A handle cavity 66 communicates with the handle attaching cavity 65 so as to allow formation of a unitary integral handle 10g and head locking handle portion 711.

The process of molding the rake is also applicable for the hoe and shovel.

Figure 21:
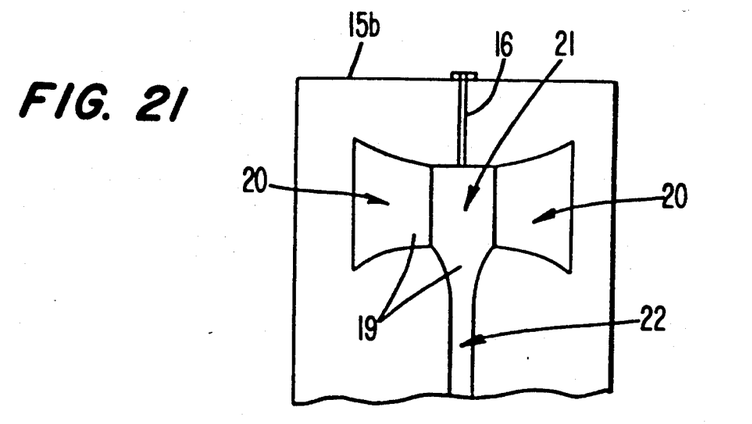
FIG. 21 shows a typical injection mold top half used to form the axe of FIG. 4.

Turning now to FIG. 21, the preferred mold for making improved implements such as the sledge, axe, and maul will now be described. FIG. 21 shows a lower mold half 15b which receives the entire working head and allows the web portion of the working head to be encapsulated. Preferably, the mold 15 includes a first cavity portion 20 sized and shaped to receive and fit tightly about the working surfaces of the implement working head to exclude mold material from the working head. A second cavity portion 21 is also provided and is sized to receive the web portion of the working head but is larger in volume than the web to allow thermoplastic material injected into the mold 15 through an injection inlet 16 to flow around and encapsulate the web.

Figure 22:
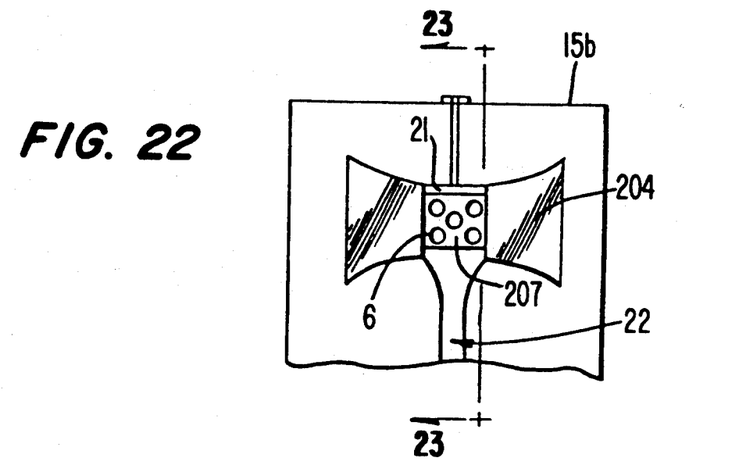
FIG. 22 shows the mold of FIG. 21 after placement of a double edged axe head into the cavity of the mold.
Figure 23:
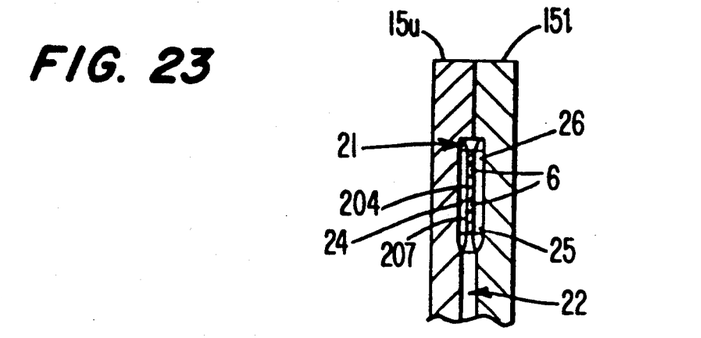
FIG. 23 is a cross-sectional view taken along the line 23—23 of FIG. 22 illustrating the side mold cavities.

As illustrated in FIG. 22, and using the double-edged axe head 204 as an example, the axe head 204 is placed into the mold 15. The upper mold half 15u is then fitted to the lower mold half 151, and heated thermoplastic material is injected into the second cavity portion 21 of the mold to form a handle by filling the second cavity portion 21 and a handle cavity 22 which is in communication with the second cavity portion 21. Since the opposed end portions of the axe head together with the web define a peripheral groove extending completely around the head, the mold material completely fills the peripheral groove to form the head locking handle portion 11.

Figure 24:
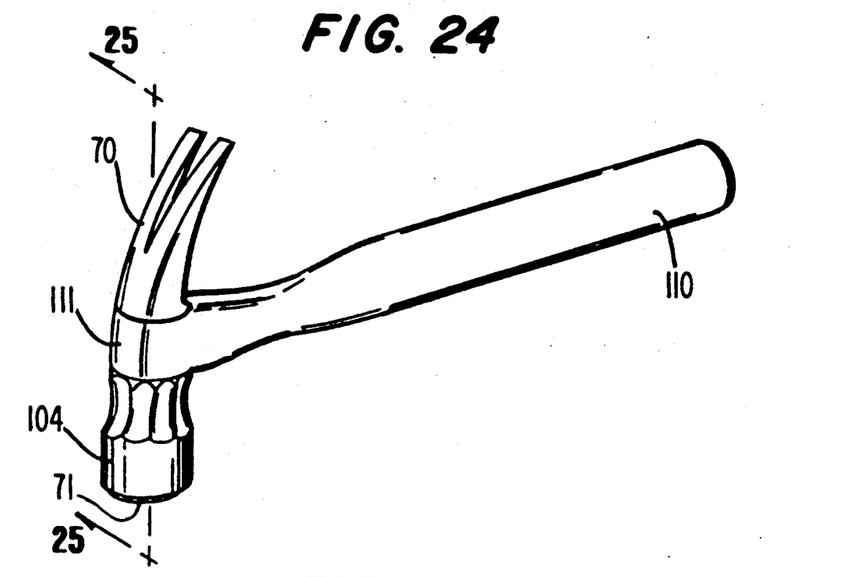
FIG. 24 is a perspective view of a preferred embodiment of the present invention as applied to a hammer.
Figure 25:
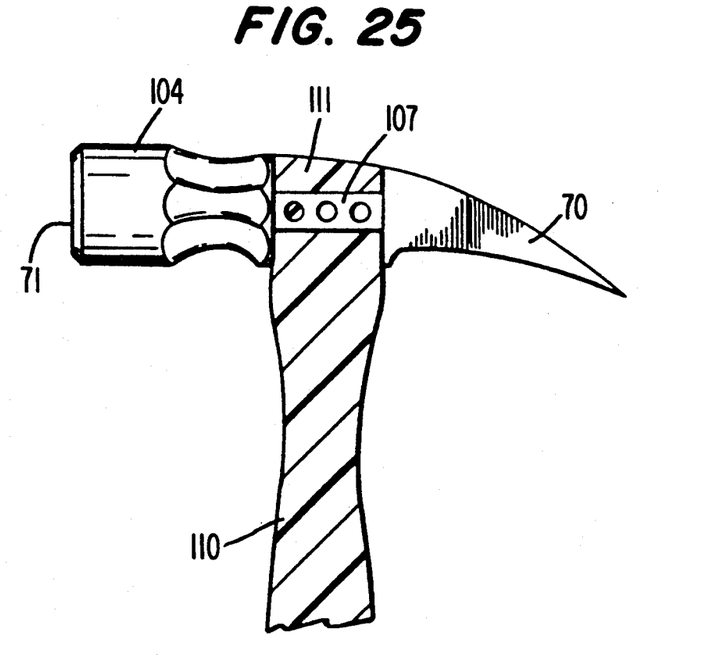
FIG. 25 is a cross sectional side view of the hammer of FIG. 24 taken along line 25—25 of FIG. 24.

FIGS. 24 and 25 illustrate a preferred embodiment of the present invention as applied to a hammer. The hammer head 104 includes striking surface 71 and nail removing portion 70 and has an intermediate portion 107 for joining the hammer head 104 to the unitary head locking handle portion 111 of the handle 110.

As illustrated in FIG. 21, the web portion 207 of the implement head such as the axe head 204 divides the second cavity portion 21 into a first side mold cavity 24, a second side mold cavity 25, and a top cavity portion 26. The first and second side mold cavities are positioned adjacent to opposite sides of the web portion 207 of the implement head. Because of the holes 6 in the implement working head, the heated thermoplastic material fills the first and second side mold cavities 24, 25, the top cavity portion 26, flows through the holes 6, and forms the rigid unitary implement head locking portion 211 which encapsulates and locks the web portion 207 of the implement working head to the handle 10 of the tool formed in the handle cavity 22.

Although not specifically illustrated, it is to be understood that the web portion 507 of the working head can include raised surfaces such as flange members 46 in FIG. 12 which extend into the first or second side mold cavities or into the top cavity portion 26, to further lock the working head to the handle. Moreover, it should be understood that the web portion of the working head may include a recess or cavity not extending completely through the thickness of the web for receiving heated thermoplastic material to further lock the working head to the handle.

It should also be understood that it is preferred for a portion of the first cavity portion 20 of the mold, which closely receives the working surfaces of the tool, to be coterminous or coextensive with a portion of the second cavity portion 21, which receives the web portion 207 of the tool head, so that the working surfaces of the finished implement are coextensive with the thermoplastic material injected into the second cavity portion of the mold, to provide a smooth, pleasing outer surface on the implement head locking handle portion 211.

In addition to the preferred embodiments set forth herein, it will be understood that the present invention may be embodied in axes, brooms, cutting blades, picks, hammers, rakes and shovels and other implements.

The methods of forging, casting or stamping the implement heads and manufacturing the necessary molds for use in the injection molding process are well known in the art and will not be described in detail herein. Additionally, the temperatures and pressures under which the thermoplastic material is introduced into the mold in the injection molding process will depend on the properties of the thermoplastic material used and such details also will be known to those skilled in the art and will not be discussed herein.

From the foregoing description of preferred embodiments of the present invention, it may be seen that the present invention provides an implement having an injected molded handle and a strong and durable bond between the implement head and the injection molded handle. Further, it will be understood by those skilled in the art that the present invention may be adapted to many different implements without departing from the scope and spirit of the present invention. It will therefore be understood that the embodiments of the present invention described above are merely illustrative, and that the present invention is limited solely by the appended claims.

We claim:

1. An implement for high-impact applications comprising:
   a unitary working head and a unitary thermoplastic handle permanently joined together;
   said working head including:
      a first working portion;
      a second working portion; and
      a web portion between said first and second working portions wherein said web portion does not extend below either of said working portions and said web portion has:
         a width and a thickness which are at some portion along said web portion less than a width and thickness of at least one of said first and second working portions; and
         a plurality of apertures extending transversely through said web portion; and
   said unitary thermoplastic handle including:
      an attaching portion molded around substantially all of said web portion and extending through said plurality of apertures of said web portion to join thermoplastic material of said handle which is on opposite sides of said web portion; and
      a handle portion extending from said attaching portion;
      wherein said attaching portion of said handle forms a strengthened permanent junction through and around said web portion said working head between said working portions of said working head to substantially prevent said working head of said implement from becoming dislodged or loosened from said handle during high-impact applications.

2. An implement as in claim 1, wherein said web portion is of the same width as said first working portion where said web portion meets said first working portion and said web portion is of the same width as said second working portion where said web portion meets said second working portion.

3. An implement as in claim 1, wherein both of said first and second working portions of said working head have surfaces which are coextensive with outer surfaces of said attaching portion of said handle.

4. An implement as in claim 1, wherein said web portion has at least three apertures extending transversely through said web portion.

5. An implement for high-impact applications comprising:
   a unitary working head and a unitary thermoplastic handle permanently joined together;
   said working head including:
      a first working portion;
      a second working portion; and
      a web portion between said first and second working portions wherein said web portion does not extend below either of said working portions and said web portion has:
         a width and a thickness which are at some portion along said web portion less than a width and thickness of at least one of said first and second working portions to define a peripheral groove about said working head; and
         a plurality of apertures extending transversely through said web portion; and
   said unitary thermoplastic handle including:
      an attaching portion molded around substantially all of said working head peripheral groove defined by said web portion and extending through said plurality of apertures of said web portion to join thermoplastic material of said handle which is on opposite sides of said web portion; and
      a handle portion extending from said attaching portion;
      wherein said attaching portion of said handle forms a strengthened permanent junction through and around said web portion of said working head between said working portions of said working head to substantially prevent said working head of said implement from becoming dislodged or loosened from said handle during high-impact applications.

6. An implement as in claim 5, wherein said web portion is of the same width as said first working portion where said web portion meets said first working portion and said web portion is of the same width as said second working portion where said web portion meets said working portion.

7. An implement as in claim 5, wherein both of said first and second working portions of said working head have surfaces which are coextensive with outer surfaces of said attaching portion of said handle.

8. An implement as in claim 5, wherein said web portion has at least three apertures extending transversely through said web portion.

9. An implement for high-impact applications comprising:
   a unitary working head and a unitary thermoplastic handle permanently joined together;
   said working head including:
      a first working portion having a first width and a first thickness;
      a second working portion having a second width and a second thickness; and
      a web portion between said first and second working portions wherein said web portion does not extend below either of said working portions and said web portion has:
         a width which is at some portion along said web portion less than said first width of said first working portion and less than said second width of said second working portion, and a thickness which is at some portion along said web portion less than said first thickness of said first working portion and less than said second thickness of said second working portion so that said web portion defines a peripheral groove about said working head; and
         a plurality of apertures extending transversely through said web portion; and
   said unitary thermoplastic handle including:
      an attaching portion molded around substantially all of said working head peripheral groove defined by said web portion and extending through said plurality of apertures of said web portion to join thermoplastic material of said handle which is on opposite sides of said web portion for interlocking said thermoplastic handle together with said implement working head; and
      a handle portion extending from said attaching portion;
      wherein said attaching portion of said handle forms a strengthened permanent junction through and around said web portion of said working head between said working portions of said working head to substantially prevent said working head of said implement from becoming dislodged or loosened from said handle during high-impact applications.

10. An implement as in claim 9, wherein said web portion is of the same width as said first working portion where said web portion meets said first working portion and said web portion is of the same width as said second working portion where said web portion meets said second working portion.

11. An implement as in claim 9, wherein both of said first and second working portions of said working head have surfaces which are coextensive with outer surfaces of said attaching portion of said handle.

12. An implement as in claim 9, wherein said web portion has at least three apertures extending transversely through said web portion.

13. An implement comprising:
 a unitary working head and a unitary thermoplastic handle permanently joined together;
 said working head including:
 a first working portion;
 a second working portion; and
 a web portion between said first and second working portions wherein said web portion does not extend below either of said working portions and said web portion has:
   a width and a thickness which are at some portion along said web portion less than a width and thickness of at least one of said first and second working portions; and
   a plurality of apertures extending transversely through said web portion; and
 said unitary thermoplastic handle including:
   an attaching portion molded around substantially all of said web portion and extending through said plurality of apertures of said web portion to join thermoplastic material of said handle which is on opposite sides of said web portion; and
   a handle portion extending from said attaching portion;
     wherein said attaching portion of said handle forms a strengthened permanent junction through and around said web portion of said working head between said working portions of said working head to substantially prevent said working head of said implement from becoming dislodged or loosened from said handle; and
     wherein said web portion is sufficiently thin at said apertures to assure that said thermoplastic attaching portion material will extend completely through said plurality of apertures in said web portion to form said junction through said web portion.

14. An implement as in claim 13, wherein both of said first and second working portions of said working head have surfaces which are coextensive with outer surfaces of said attaching portion of said handle.

15. An implement as in claim 13, wherein said web portion has at least three apertures extending transversely through said web portion.

16. An implement as in claim 13, wherein said web portion is of the same width as said first working portion where said web portion meets said first working portion and said web portion is of the same width as said second working portion where said web portion meets said second working portion.

* * * * *